(12) United States Patent
Remein et al.

(10) Patent No.: US 10,484,098 B2
(45) Date of Patent: *Nov. 19, 2019

(54) CHANNEL BONDING IN PASSIVE OPTICAL NETWORKS

(71) Applicant: Futurewei Technologies, Inc., Plano, TX (US)

(72) Inventors: Duane Remein, Raleigh, NC (US); Frank Effenberger, Frisco, TX (US); Yuanqiu Luo, Cranbury, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,555

(22) Filed: Jan. 28, 2019

(65) Prior Publication Data

US 2019/0158185 A1    May 23, 2019

Related U.S. Application Data

(63) Continuation of application No. 15/988,320, filed on May 24, 2018, now Pat. No. 10,200,129, which is a
(Continued)

(51) Int. Cl.
*H04B 10/50* (2013.01)
*H04B 10/27* (2013.01)
(Continued)

(52) U.S. Cl.
CPC ............. *H04B 10/50* (2013.01); *H04B 10/27* (2013.01); *H04B 10/272* (2013.01);
(Continued)

(58) Field of Classification Search
CPC .......... H04B 10/50; H04B 10/27; H04L 69/14
(Continued)

(56) References Cited

U.S. PATENT DOCUMENTS

2004/0062278 A1    4/2004    Hadzic et al.
2004/0208576 A1    10/2004   Kinoshita et al.
(Continued)

FOREIGN PATENT DOCUMENTS

| CN | 101902666 A | 12/2010 |
| CN | 103856836 A | 6/2014 |
| EP | 1365548 A1 | 11/2003 |

OTHER PUBLICATIONS

Machine Translation and Abstract of Chinese Publication No. CN101902666, Dec. 1, 2010, 14 pages.
(Continued)

*Primary Examiner* — Juan A Torres
(74) *Attorney, Agent, or Firm* — Conley Rose, P.C.

(57) ABSTRACT

A method implemented at a transmitter in a passive optical network (PON), the method comprising the transmitter fragmenting a data packet into multiple frames, with each frame of the multiple frames including a data packet preamble, with the data packet preamble including an indicator associated with at least one lane to be used to transmit the data packet and a logical link identifier (LLID), the indicator identifying a first lane selected from a plurality of lanes, identifying at least one frame transmitted over the first lane, and identifying the lane order of the plurality of lanes, and the transmitter transmitting the multiple frames over the plurality of lanes.

19 Claims, 8 Drawing Sheets

Related U.S. Application Data continuation of application No. 15/259,777, filed on Sep. 8, 2016, now Pat. No. 10,009,110.

(60) Provisional application No. 62/215,862, filed on Sep. 9, 2016.

(51) Int. Cl.
*H04B 10/272* (2013.01)
*H04J 14/02* (2006.01)
*H04L 29/06* (2006.01)

(52) U.S. Cl.
CPC ...... *H04J 14/0227* (2013.01); *H04J 14/0273* (2013.01); *H04J 14/0282* (2013.01); *H04L 69/14* (2013.01)

(58) Field of Classification Search
USPC .......................................................... 398/58
See application file for complete search history.

(56) References Cited

U.S. PATENT DOCUMENTS

| | | |
|---|---|---|
| 2008/0198857 A1 | 8/2008 | Kim et al. |
| 2008/0298806 A1 | 12/2008 | Effenberger |
| 2013/0343761 A1 | 12/2013 | Fang et al. |
| 2014/0186041 A1 | 7/2014 | Shellhammer et al. |
| 2014/0199069 A1 | 7/2014 | Garavaglia et al. |

OTHER PUBLICATIONS

Machine Translation and Abstract of Chinese Publication No. CN103856836, Jun. 11, 2014, 9 pages.
"Link Aggregation," IEEE Standard for Local and Metropolitan Area Networks, IEEE Std 802.1AX-2008, Nov. 3, 2008, 163 pages.
"Part 3: Carrier Sense Multiple Access with Collision Detection (CSMA/CD) Access Method and Physical Layer Specifications," Information Technology—Telecommunications and Information Exchange Between Systems—Local and Metropolitan Area Networks—Specific Requirements, IEEE 802.3, 2005, 417 pages.
"Amendment 4: Provider Bridges, Virtual Bridged Local Area Networks," IEEE Standard for Local and Metropolitan Area Networks, IEEE 802.1ad-2005 (Amendment to IEEE Std 802.1Q-2005), May 26, 2006, 73 pages.
Foreign Communication From A Counterpart Application, PCT Application No. PCT/CN2016/098549, English Translation of International Search Report dated Nov. 28, 2016, 4 pages.
Foreign Communication From A Counterpart Application, PCT Application No. PCT/CN2016/098549, English Translation of Written Opinion dated Nov. 28, 2016, 4 pages.
Office Action dated Oct. 20, 2017, 25 pages, U.S. Appl. No. 15/259,777, filed Sep. 8, 2016.
Notice of Allowance dated Feb. 26, 2018, 7 pages, U.S. Appl. No. 15/259,777, filed Sep. 8, 2016.
Office Action dated Jun. 21, 2018, 19 pages, U.S. Appl. No. 15/988,320, filed May 24, 2018.
Notice of Allowance dated Sep. 28, 2018, 8 pages, U.S. Appl. No. 15/988,320, filed May 24, 2018.

400

| Original Packet | | | | | preamble: 55 55 55 55 55 55 55 5d | | | | | | | data: d1 d2 ... d70 | | | | |
|---|---|---|---|---|---|---|---|---|---|---|---|---|---|---|---|---|
| Row | Function | XGMII Channel/Col | | | | | | | | | | | | | | |
| | | 1 | | | | 2 | | | | 3 | | | | 4 | | |
| | | 1 | 2 | 3 | 4 | 1 | 2 | 3 | 4 | 1 | 2 | 3 | 4 | 1 | 2 | 3 | 4 |
| 1 | bonded | /S | 55 | 5D | 55 | /S | 55 | 5D | 55 | /S | 55 | 5D | 55 | /S | 55 | 5D | 55 |
| 2 | preamble | 59 | M\LLID | | CRC8 | 5A | M\LLID | | CRC8 | 5B | M\LLID | | CRC8 | 5C | M\LLID | | CRC8 |
| 3 | data | d1 | d2 | d3 | d4 | d5 | d6 | d7 | d8 | d9 | d10 | d11 | d12 | d13 | d14 | d15 | d16 |
| 4 | data | d17 | d18 | d19 | d20 | d21 | d22 | d23 | d24 | d25 | d26 | d27 | d28 | d29 | d30 | d31 | d32 |
| 5 | data | d33 | d34 | d35 | d36 | d37 | d38 | d39 | d40 | d41 | d42 | d43 | d44 | d45 | d46 | d47 | d48 |
| 6 | data | d49 | d50 | d51 | d52 | d53 | d54 | d55 | d56 | d57 | d58 | d59 | d60 | d61 | d62 | d63 | d64 |
| 7 | Terminate & | d65 | d66 | d67 | d68 | d69 | d70 | /T | /I1 | /T | /I1 | /I2 | /I3 | /T | /I1 | /I2 | /I3 |
| 8 | Idle | /T | /I1 | /I2 | /I3 | /I2 | /I3 | /I4 | /i | /I4 | /i | /i | /i | /I4 | /i | /i | /i |
| 9 | expansion | /I4 | /i | /i | /i | /i | /i | /i | /i | /i | /i | /i | /i | /i | /i | /i | /i |
| 10 | next start | 59 | M\LLID | | CRC8 | --- | | | | --- | | | | --- | | | |

/S      Start control character

/T /      Terminate control character

/I /      Idle control character (for rate adaptation)

/i/      Stuffing idle control characters added to justify all channels d#      Packet data

Preamble

FIG. 4

CHANNEL BONDING IN PASSIVE OPTICAL NETWORKS

CROSS-REFERENCE TO RELATED APPLICATIONS

The present application is a continuation of U.S. patent application Ser. No. 15/988,320 filed May 24, 2018 by Duane Remein, et al., and titled "Channel Bonding in Passive Optical Networks," which is a continuation of U.S. patent application Ser. No. 15/259,777 filed Sep. 8, 2016, now U.S. Pat. No. 10,009,110 and issued Jun. 26, 2018, by Duane Remein, et al., and titled "Channel Bonding in Passive Optical Networks," which claims priority to U.S. provisional patent application No. 62/215,862 filed Sep. 9, 2015 by Duane Remein, et al., and titled "Channel Bonding in Ethernet Access Networks," all three of which are herein incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile," which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity may be shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point (P2P) WDM PONs (P2P-WDM PONs), which may provide data rates higher than 10 Gb/s. NG-PONs and NG-PON2s may also include time- and wavelength-division multiplexing (TWDM) PONs, which may also provide data rates higher than 10 Gb/s.

TWDM PONs may combine TDMA and WDMA to support higher capacity so that an increased number of users can be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

As demand for higher data transmission rates rise, it may be necessary for PON systems to operate over multiple wavelengths, such as two or four 25 Gigabits per second (Gb/s) wavelengths. To this end, conventional PONs may employ an approach such as link aggregation in which multiple links may be combined to increase throughput as compared to transmissions over a single link. However, such approaches typically do not utilize the increased bandwidth provided by the aggregated links in an efficient manner. For instance, conventional link aggregation schemes may utilize about 60% of the aggregated link capacity, or even a lesser percentage in some cases. The concepts disclosed herein provide an inverse multiplexing scheme that involves modifying a preamble such that aggregated bandwidth may be used more efficiently, while reducing overall latency in PON systems.

In an embodiment, the disclosure includes a method implemented at a transmitter in a passive optical network (PON). The method includes the transmitter modifying a preamble of a data packet to include an indicator associated with at least one lane to be used to transmit the data packet. The method further includes the transmitter fragmenting the data packet into frames, and transmitting the frames over a plurality of lanes, where the indicator is configured to identify a first lane selected from the plurality of lanes and to identify at least one frame transmitted over the first lane.

In some embodiments, the method includes replicating the indicator into each lane within the plurality of lanes in response to fragmenting the data packets into frames. In one or more embodiments, each indicator is configured to identify a respective set of frames transmitted over a lane in which that indicator has been replicated. In one or more embodiments, each indicator is further configured to indicate that frames within the respective set of frames form part of the data packet. In one or more embodiments, the replicated indicators are configured to identify at least one of: each lane used to transmit the frames; frames transmitted over each lane; each frame associated with the data packet; and a lane order occupied by a particular frame. In one or more embodiments, the transmitter includes a reconciliation sublayer (RS), with the RS modifying the preamble to include the indicator. In one or more embodiments, the RS is coupled to the plurality of lanes via a plurality of media-independent interfaces.

In another embodiment, the disclosure includes an apparatus in a passive optical network (PON). The apparatus includes a reconciliation sublayer (RS) configured to modify a preamble of a data packet to include an indicator associated with at least one lane to be used to transmit the data packet. The apparatus further includes a transmitter coupled to the RS and configured to transmit the data packet in multiple fragments over a plurality of lanes, where the indicator is configured to identify a first lane selected from the plurality of lanes and to identify at least one fragment transmitted over the first lane.

In some embodiments, the RS is further configured to replicate the indicator into each lane within the plurality of lanes. In one more embodiments, each indicator is configured to identify a respective set of fragments transmitted over a lane in which that indicator has been replicated. In one more embodiments, each indicator is further configured to indicate that fragments within the respective set of fragments form part of the data packet. In one or more embodiments, the replicated indicators are configured to identify at least one of: each lane used to transmit the frames; frames transmitted over each lane; each frame associated with the data packet; and a lane order occupied by a particular frame. In one more embodiments, the apparatus further comprises a plurality of media-independent interfaces configured to interconnect the RS to a plurality of physical layers. In one more embodiments, the plurality of media-independent interfaces comprise a Gigabit media-independent interface (GMII), a 10 GMII (XGMII), a 25 GMII (25G-MII), or any combination thereof.

In yet another embodiment, the disclosure includes a non-transitory computer-readable medium storing computer instructions for implementing a method in a passive optical network (PON). The instructions for implementing the method being such that when executed by one or more processors, cause the one or more processors to perform the steps of modifying a preamble of a data packet to include an indicator associated with at least one lane to be used to transmit the data packet, fragmenting the data packet into frames, and transmitting the frames over a plurality of lanes. The indicator is configured to identify a first lane selected from the plurality of lanes and to identify at least one frame transmitted over the first lane.

In some embodiments, the instructions for implementing the method being such that when executed by the one or more processors, cause the one or more processors to perform the step of replicating the indicator into each lane within the plurality of lanes in response to fragmenting the data packets into frames. In one or more embodiments, each indicator is configured to identify a respective set of frames transmitted over a lane in which that indicator has been replicated. In one or more embodiments, each indicator is further configured to indicate that frames within the respective set of frames form part of the data packet. In one or more embodiments, the replicated indicators are configured to identify at least one of: each lane used to transmit the frames; frames transmitted over each lane; each frame associated with the data packet; and a lane order occupied by a particular frame. In one or more embodiments, a reconciliation sublayer (RS) is used to modify the preamble to include the indicator, where the RS is coupled to the plurality of lanes via a plurality of media-independent interfaces.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a diagram of a bonded frame according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for using an inverse multiplexing scheme such as channel bonding to achieve increased data rates in a PON. To this end, a plurality of data packets may be fragmented and transmitted over multiple lanes (e.g., multiple transmission lines or channels) bonded to one another, where a preamble of a data packet may be modified to include channel bonding information. The channel bonding information within the modified preamble may identify different data packets and/or fragments, as well as distinct lanes through which each data packet/fragment is transmitted. Further, the inverse multiplexing scheme may support communications where bonded channels may be combined with non-bonded channels such as in a same optical distribution network (ODN).

Figure 1:
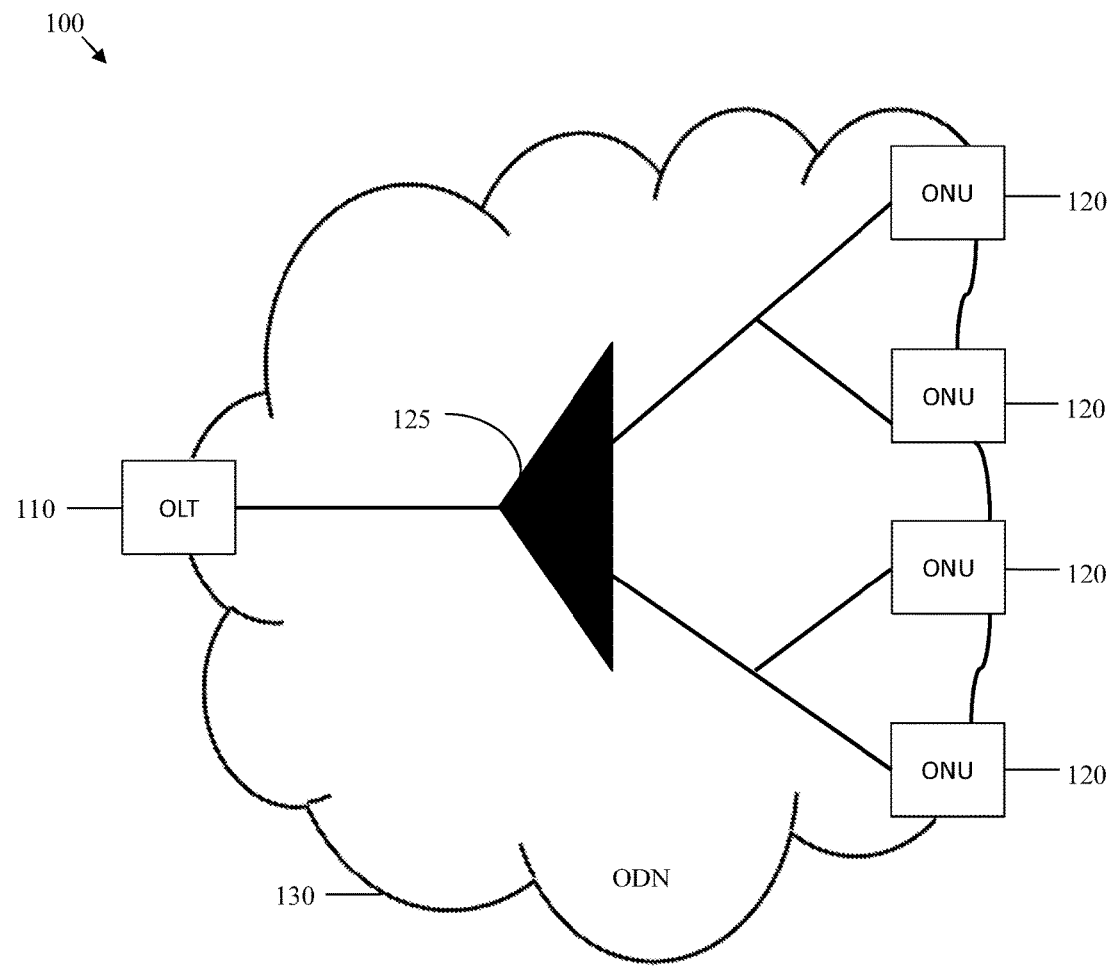
FIG. 1 is a schematic diagram of a PON.

FIG. 1 is a schematic diagram of a passive optical network (PON) 100 for implementing embodiments of the present disclosure. The PON 100 may comprise an optical line terminal (OLT) 110, one or more optical network units (ONUs) 120, and an ODN 130 configured to couple the OLT 110 to the ONUs 120. While four ONUs are depicted in FIG. 1, the PON 100 may comprise more or less ONUs 120 in other implementations.

The PON 100 may be configured as a communications network that may not require active components to distribute data between the OLT 110 and the ONUs 120. Instead, the PON 100 may use passive optical components in the ODN 130 to distribute data between the OLT 110 and the ONUs 120. The PON 100 may comprise any suitable network such as a next-generation PON (NG-PON), an NG-PON1, an NG-PON2, a gigabit-capable PON (GPON), a 10 gigabit per second PON (XG-PON), an Ethernet PON (EPON), a 10 gigabit per second EPON (10G-EPON), a next-generation EPON (NG-EPON), a wavelength-division multiplexing (WDM) PON, a time- and wavelength-division multiplexing (TWDM) PON, point-to-point (P2P) WDM PONs (P2P-WDM PONs), an asynchronous transfer mode PON (APON), a broadband PON (BPON), etc.

An EPON is a PON standard developed by the Institute of Electrical and Electronics Engineers (IEEE) and specified in IEEE 802.3, which is incorporated herein by reference as if reproduced in its entirety. In EPON, a single fiber can be used for both the upstream and the downstream transmission with different wavelengths. The OLT 110 may implement an EPON Media Access Control (MAC) layer for transmission of Ethernet frames, while a Multi-Point Control Protocol (MPCP) may be implemented to perform bandwidth assignment, bandwidth polling, auto-discovery, ranging, and the like. Ethernet frames may be broadcast downstream based on a Logical Link Identifier (LLID) embedded in a preamble frame. Upstream bandwidth may be assigned based on the exchange of signals (e.g., Gate and Report messages) between the OLT 110 and an ONU 120.

The OLT 110 is configured to communicate with the ONUs 120 and another network (not shown). Specifically, the OLT 110 may act as an intermediary between the other network and the ONUs 120. For instance, the OLT 110 may forward data received from the other network to the ONUs 120, and forward data received from the ONUs 120 to the other network. The OLT 110 may comprise at least one transmitter and receiver. In scenarios where the other network uses a network protocol different from the protocol used in the PON 100, the OLT 110 may comprise a converter for converting the network protocol to the PON protocol, and vice versa. The OLT 110 is typically located at a central location such as a central office (CO), but it may also be located at other suitable locations.

In some implementations, the ODN 130 may be a data distribution system that includes optical fiber cables, couplers, splitters, distributors, and/or other equipment. Such components may include passive optical components that do not require power to distribute data signals between the OLT 110 and the ONUs 120. Alternatively, one or more components within the ODN 130 may take the form of active (e.g., powered) components such as optical amplifiers. The ODN 130 may typically extend from the OLT 110 to the ONUs 120 in a branching configuration as shown, but the ODN 130 may be configured in any other suitable point-to-multipoint (P2MP) configuration.

In an embodiment, the ODN 130 may comprise an optical splitter 125 located between the OLT 110 and ONUs 120. The splitter 125 may be any suitable device for splitting a combination of optical signals and forwarding the split signals to the ONUs 120. The splitter 125 may also be any suitable device for receiving signals from the ONUs 120, combining those signals into a combined received signal, and forwarding the combined received signal to the OLT 110. For example, the splitter 125 may split a downstream optical signal into n split downstream optical signals in the downstream direction (e.g., from the OLT 110 to the ONUs 120), and combine n upstream optical signals into one combined upstream optical signal in the upstream direction (e.g., from the ONUs 120 to the OLT 110), where n is equal to the number of ONUs 120. In some aspects, the OLT 110 may comprise a bi-directional optical amplifier (OA) to amplify a combined transmitted signal as needed in order to forward the combined transmitted signal to the splitter 125, and to receive a combined signal from the splitter 125 and amplify the combined received signal as needed.

The ONUs 120 may communicate with the OLT 110 and a customer or user (not shown), and the ONUs 120 may act as an intermediary between the OLT 110 and the customer. For instance, the ONUs 120 may forward data from the OLT 110 to the customer, and forward data from the customer to the OLT 110. The ONUs 120 may comprise an optical transmitter for transmitting optical signals to the OLT 110 and an optical receiver for receiving optical signals from the OLT 110. The ONUs 120 may further comprise a converter that converts optical signals into electrical signals and converts electrical signals into optical signals. In some aspects, the ONUs 120 may comprise a second transmitter that transmits the electrical signals to the customer and a second receiver that receives electrical signals from the customer. ONUs 120 and optical network terminals (ONTs) are similar, and thus the terms may be used interchangeably herein. The ONUs 120 may typically be located at distributed locations such as customer premises, but they may also be located at other suitable locations.

In NG-PON systems, data rates may be expected to reach or exceed about 25 Gigabits per second (Gb/s) over a single wavelength (or channel), and about 50 Gb/s or 100 Gb/s over two or four 25 Gb/s wavelengths, respectively. Due to optical limitations, supporting such data rates in NG-PONs may be challenging, even when using higher-level modulation schemes such as three-level (3-level) duobinary and pulse amplitude modulation (PAM) with four amplitude levels (PAM-4). To achieve higher data rates, an NG-PON may employ a link aggregation scheme such as defined by the Electrical and Electronics Engineers (IEEE) 802.1ad standard, which is incorporated herein by reference. For example, such a scheme typically involves aggregating multiple links together to form a link aggregation group (LAG), in which case an entity such as Medium Access Control (MAC) client may treat the LAG as a single link.

While link aggregation schemes may increase data rates by combining limited rates of individual links, a typical LAG may only reach about 40-60% of the aggregated link capacity. Moreover, link aggregation schemes often employ hashing algorithms to distribute or route traffic among links of the LAG based on fields such as destination and source MAC addresses. For example, in a point-to-point topology where there is a single source MAC address and a single destination MAC address, traditional hashing algorithms may result in hashing the source and destination MAC addresses such that all traffic is output to the same port. Consequently, data traffic may not be effectively distributed in such cases. Furthermore, link aggregation schemes may need multiple MAC instances (e.g., clients, protocol stacks, etc.) to communicate data over LAGs.

In an alternative approach, whole-sized packet frames may be transmitted over individual lanes. This approach may include monitoring the time of arrival of a frame and then reordering packets according to their original order based on the arrival time of the first packet (or byte of the first packet). However, this approach may demand a significant amount of buffering at the OLT 110 and ONU 120. In addition, undesirable delays may be incurred by transmitting whole-sized packet frames. By comparison, buffer requirements and/or transmission delays may be minimized by fragmenting data packets into relatively small frames and transmitting the fragmented frames over multiple lanes rather than an individual lane.

In an embodiment, the PON 100 may employ an inverse multiplexing scheme such as channel bonding to achieve increased data rates as compared to that achievable over a single optical channel. Specifically, data packets may be fragmented into a plurality of frames and transmitted over multiple lanes using a modified preamble, which may improve overall performance as compared to conventional approaches such as link aggregation. For example, the disclosed embodiments may provide aggregation at close to full link capacity, while maintaining latency commensurate with that expected from a link of capacity. Moreover, these features may be realized using a single MAC instance. Further, the PON 100 may be built on existing EPON protocols, thus requiring minimal modification. The PON 100 may also be optimized for NG-PON standards such as NG-PON2 and NG-EPON, which may include WDM, TDM, and/or TWDM schemes. While the disclosed embodiments may generally focus on PONs, the embodiments apply to any Ethernet or other access networks.

Table 1 below depicts an example of a preamble according to a traditional Ethernet frame. Briefly, a traditional Ethernet frame typically comprises a preamble having seven bytes of hexadecimal values (0x55), which make up the first field of an Ethernet packet. The eighth byte includes a start of frame delimiter (SFD) value (0xd5) that indicates the end of the preamble and the beginning of the Ethernet frame.

TABLE 1

| 8 Bytes | Preamble Field | Preamble/SFD |
| --- | --- | --- |
| 1 | — | 0x55 |
| 2 | — | 0x55 |
| 3 | — | 0x55 |
| 4 | — | 0x55 |
| 5 | — | 0x55 |
| 6 | — | 0x55 |
| 7 | — | 0x55 |
| 8 | SFD | 0xd5 |

Figure 2:
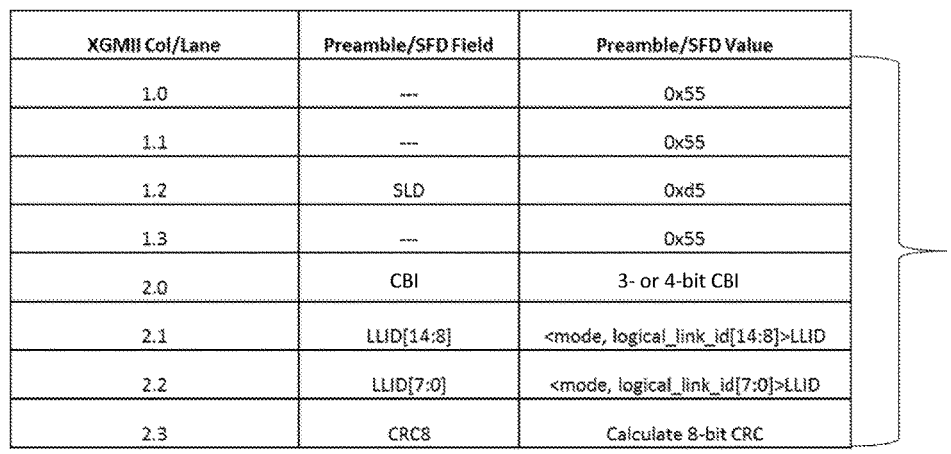
FIG. 2 is a diagram of a frame structure according to an embodiment of the disclosure.

Referring now to FIG. 2, a diagram is depicted of a frame structure 200 comprising a modified preamble 210, which may be part of a message exchanged between the OLT 110 and ONUs 120. As discussed further with respect to FIG. 3, a frame structure 200 such as depicted in FIG. 2 may include various data bits and characters following the modified preamble 210. In general, the frame structure 200 may correspond to part of an Ethernet frame that the PON 100 may employ when implemented as an EPON. In such implementations, the preamble 210 may be modified pursuant to IEEE standards such as IEEE 802.3ca, which is incorporated herein by reference. As shown in column/lane 1.2 of the frame structure 200, the third byte of the modified preamble 210 may include a start of logical link identifier (LLID) delimiter (SLD) value (0xd5). The SLD is an EPON-specific replacement for the traditional Ethernet SFD (0xd5) transmitted in the eighth byte of the preamble. In addition, the sixth and seventh bytes of the modified preamble 210 may include an LLID followed by a cyclic redundancy check 8 (CRC8), which is an 8-bit error-detection code calculated as a function of the first bit of the SLD through the last bit of the LLID. In implementations where the frame structure 200 is used for transmissions over point-to-point (P2P) links, the LLID in the sixth and seventh bytes of the preamble 210 may not be necessary, and thus replaced with other fields, e.g., hexadecimal values (0x55).

In an embodiment, the modified preamble 210 may include a channel bonding indication (CBI) field. While the CBI field is depicted in the fifth byte of the preamble 210 at column/lane 2.0, the CBI field may be located in a different byte in other implementations. For example, the CBI field may be located in the fourth byte of the preamble 210 at column/lane 1.3, in which case the fifth byte of the preamble 210 at column/lane 2.0 may simply include a hexadecimal value (0x55). In addition, while the CBI field may occupy an 8-bit field, the size of the CBI value may depend on the number of lanes (or channels) to be linked. For instance, a CBI value comprising three to four bits may be sufficient if the number of lanes is equal to two or four, while more bits may be necessary for data transmissions over a greater number of lanes. The size of the CBI value may also depend on the data rate of each lane.

In some aspects, the CBI field may serve at least three purposes. First, the CBI field may indicate that a particular frame is part of a bonded MAC frame. Second, the CBI field may identify the lane order occupied by this particular part of the bonded MAC frame. Third, the CBI field may serve as a synchronization indicator to assist a receiver with aligning fragmented packets in a proper order. Additionally or alternatively, the CBI field may indicate whether data fragments in different lanes are associated with the same or different LLIDs.

Figure 3:
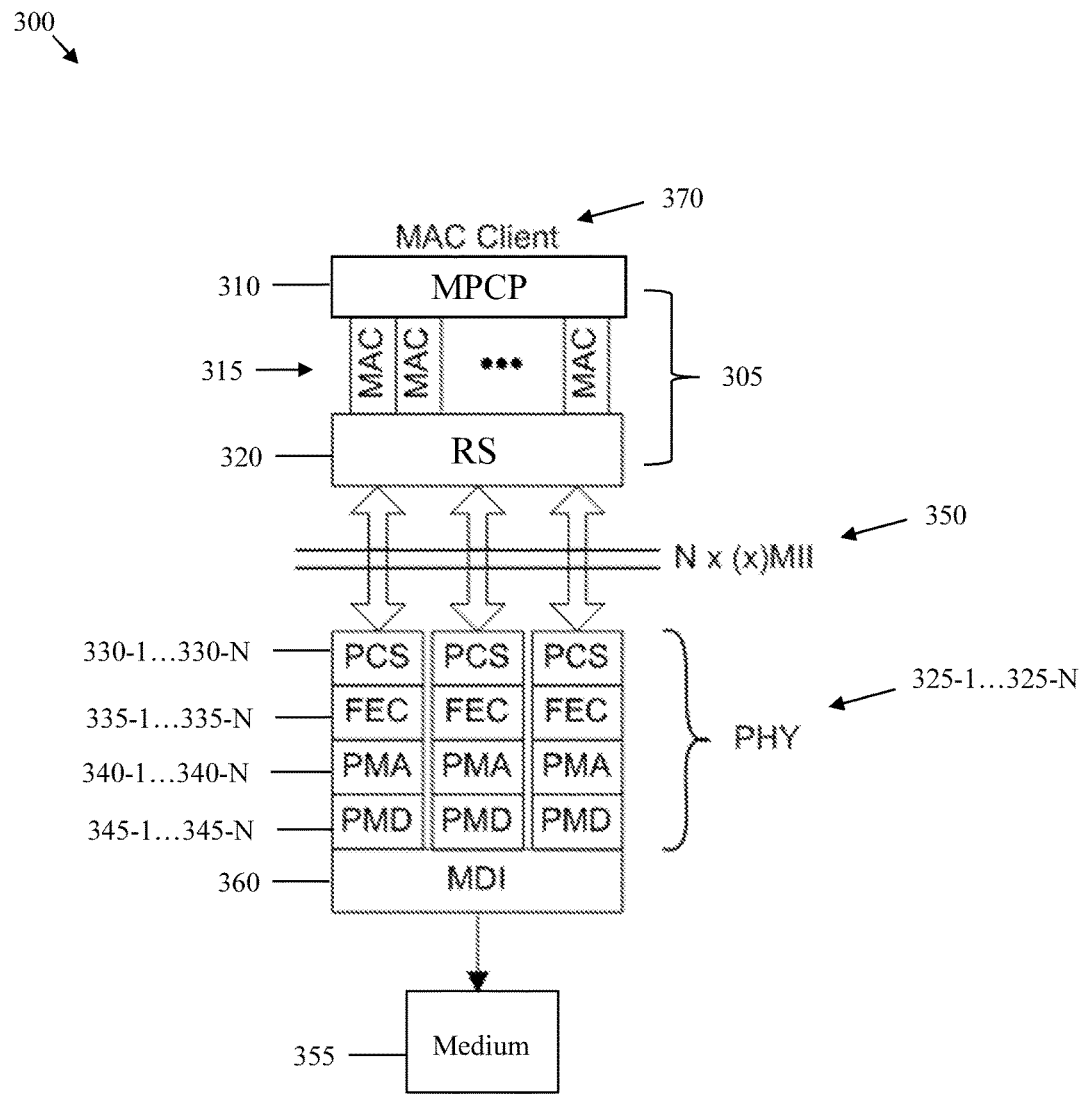
FIG. 3 is a schematic diagram of a channel bonding device according to an embodiment of the disclosure.

FIG. 3 depicts an embodiment of a channel bonding device 300, which may be implemented by the OLT 110 and each ONU 120. The channel bonding device 300 may comprise a datalink layer 305 including a MAC or multipoint MAC Control 310 such as a Multi-Point Control Protocol (MPCP), and one or more MAC sublayers 315 coupled to a reconciliation sublayer (RS) 320. In a conventional PON system, the channel bonding device 300 may employ a single media independent interface (MII) to interconnect the datalink layer 305 to a physical layer, which may include a physical coding sublayer (PCS), a forward error correction (FEC) sublayer, a physical-medium-attachment (PMA) sublayer, and a physical-medium-dependent (PMD) sublayer.

In an embodiment, the RS 320 may be enhanced to interface with multiple physical layers 325-1 . . . 325-N via a number N of MIIs 350, where N is a positive integer greater than one. The MMI 350 may be implemented as any suitable interface such as a Gigabit MMI (GMII), 10 GMII (XGMII), 25 GMII (25G-MII), etc. For instance, if the PON 100 comprises a 100G-PON, N MIIs 350 may comprise four 25G-MIIs for data transmissions over up to four lanes. In some implementations, N MIIs 350 may comprise different types of interfaces. For example, the RS 320 may interface with one physical layer 325-1 via a GMII and interface with another physical layer 325-N via a 25G-MII. The physical layers 325-1 . . . 325-N may include respective PCSs 330-1 . . . 330-N, FEC sublayers 335-1 . . . 335-N, PMA sublayers 340-1 . . . 340-N, and PMD sublayers 345-1 . . . 345-N, which may each interface with a medium 355 (e.g., fiber optic media) through a medium-dependent interface (MDI) 360. In other implementations, the physical layers 325-1 . . . 325-N may include more or less sublayers.

Notably, the channel bonding device 300 may be implemented with existing and/or future PON protocols with minimal changes. For instance, no changes may be needed to the MAC Control 310 and MAC sublayers 315, while no changes beyond those expected may be needed to the PCSs 330-1 . . . 330-N, FEC sublayers 335-1 . . . 335-N, PMA sublayers 340-1 . . . 340-N, and/or PMD sublayers 345-1 . . . 345-N. The functions of the MAC Control 310, MAC sublayers 315, PCS sublayers 330-1 . . . 330-N, FEC sublayers 335-1 . . . 335-N, PMA sublayers 340-1 . . . 340-N, PMD sublayers 345-1 . . . 345-N, and MDI 360 are well known to those of ordinary skill in the art. Therefore, discussion of these elements will be limited to the extent necessary for enabling a proper understanding of the present disclosure.

Generally, the MAC Control 310 protocol may perform bandwidth allocation, bandwidth polling, auto-discovery, ranging, data encapsulation, etc. The MAC sublayers 315 may provide addressing and channel access services to the physical layers 325-1 . . . 325-N and sublayers thereof. The PCS sublayers 330-1 . . . 330-N may perform encoding, multiplexing, and synchronization of outgoing data streams. The FEC sublayers 335-1 . . . 335-N may perform error control by inserting parity bits into frames received from the N MMIs 350 for transmission. The PMA sublayers 340-1 . . . 340-N may support the exchange of code-groups between PCS entities, convert such code-groups into bits, and pass the bits to the PMD sublayers 345-1 . . . 345-N (and vice versa). The PMD sublayers 345-1 . . . 345-N may provide an interface from the PMA sublayers 340-1 . . . 340-N to the transmission medium 355.

In operation, the channel bonding device 300 may receive (e.g., at RS 320) a request to transmit data from a MAC client 370 implemented in or at the datalink layer 305. In turn, data from one or more MAC layers 315 may be input to the RS 320, which may add a CBI field to a modified preamble 210 (see FIG. 2) for bonded channels at a transmitter. When receiving data packets, the RS 320 may use the CBI field to reassemble data packets in a proper order at a receiver. If multiple fragments of a data packet are received (e.g., via N MMIs 350), the RS 320 may use the CBI field to reconstruct the data packet, which may then be delivered to the MAC client via one of the MAC layers 310. As discussed further below with respect to FIGS. 5 and 6, the channel bonding device 300 may comprise one or more transceiver units to perform such operations.

FIG. 4 depicts an example of a bonded frame 400 transmitted by the channel bonding device 300 over an interface (e.g., MII 350) comprising multiple channels (or lanes). While this example may be based on stripping data across an XGMII comprising four lanes numbered 1 through 4, other examples may employ any suitable interface comprising the same or different number of lanes. In addition, rather than striping data in terms of bits or bytes, data may be striped by words (e.g., multiple bytes), or by code words (e.g., FEC code words). For example, if the PON 100 comprises a 10G-EPON, code words may include a Reed-Solomon code word such as RS(255,223).

When transmission of the bonded frame 400 is initiated, the RS 320 may copy a modified preamble (e.g., preamble 210) into each of the four lanes in rows 1 and 2, where each modified preamble may include a CBI field that identifies a specific lane associated with that modified preamble. Next, the RS 320 may stripe data packets across the four lanes, beginning with a first data byte (d1) transmitted via lane 1 in column 1 of row 3 and ending with a last data byte (d70) transmitted via lane 2 in column 2 of row 7. In some aspects, the RS 320 may divide data packets into fragments (e.g., 32-byte fragments for an XGMII) and then assign the fragmented data packets to each of the four lanes in a round robin fashion.

In FIG. 4, the last data packet transmitted in each of the four lanes may be followed by a terminate symbol /T/. That is, data transmitted in lane 1 terminates in column 1 of row 8; data transmitted in lane 2 terminates in column 3 of row 7; data transmitted in lane 3 terminates in column 1 of row 7; and data transmitted in lane 4 terminates in column 1, row 7. In some cases, symbols following each /T/ symbol may be filled with one or more idle characters /I/, such as to maintain compatibility with a current definition of the MMI. For instance, idle characters may be necessary in order for data transmitted via the lanes to get across the MMI.

While the number of idle characters may vary in other examples (e.g., depending on implementation), FIG. 4 depicts an example using four idle characters /I1/, /I2/, /I3/, /I4/. In lane 2 of this example, the /T/ symbol is followed by a first idle character /I1/ in column 4 of row 7, while the remaining three idle characters /I2/, /I3/, /I4/ in lane 2 occupy columns 1-3 of row 8. In lanes 3 and 4, the first three idle characters /I1/ /I2/, /I3/ occupy column 2-4 of row 7, while the fourth idle character /4/ in lanes 3 and 4 occupies column 1 in row 8. In lane 1, the first three idle characters /I2/, /I3/, /I4/ occupy columns 2-4 of row 8, while the fourth idle character /I4/ in lane 1 occupies column 1 of row 9.

In some implementations, one or more stuffing idle characters /i/ may be added, e.g., to justify or align all four lanes, avoid misinterpretation of data, etc. For instance, following the fourth idle character /I4/ in lane 1, three stuffing idle characters /i/ may be added in columns 2-4 of row 9. In lane 2, one stuffing idle character /i/ may be added in column 4 of row 8, while four stuffing idle characters /i/ may be added in columns 1-4 of row 9. In lanes 3 and 4, three stuffing idle characters /i/ may be added in columns 2-4 of row 8, while four stuffing idle characters /i/ may be added in columns 1-4 of row 9. Further, the idle characters /I/ and/or stuffing idle characters /i/ discussed herein may be supplied by the datalink layer 305 (e.g., via MAC Control 310). Lastly, row 10 comprises the next opportunity to begin a new data frame transmission (e.g., in lane 2).

Figure 5:
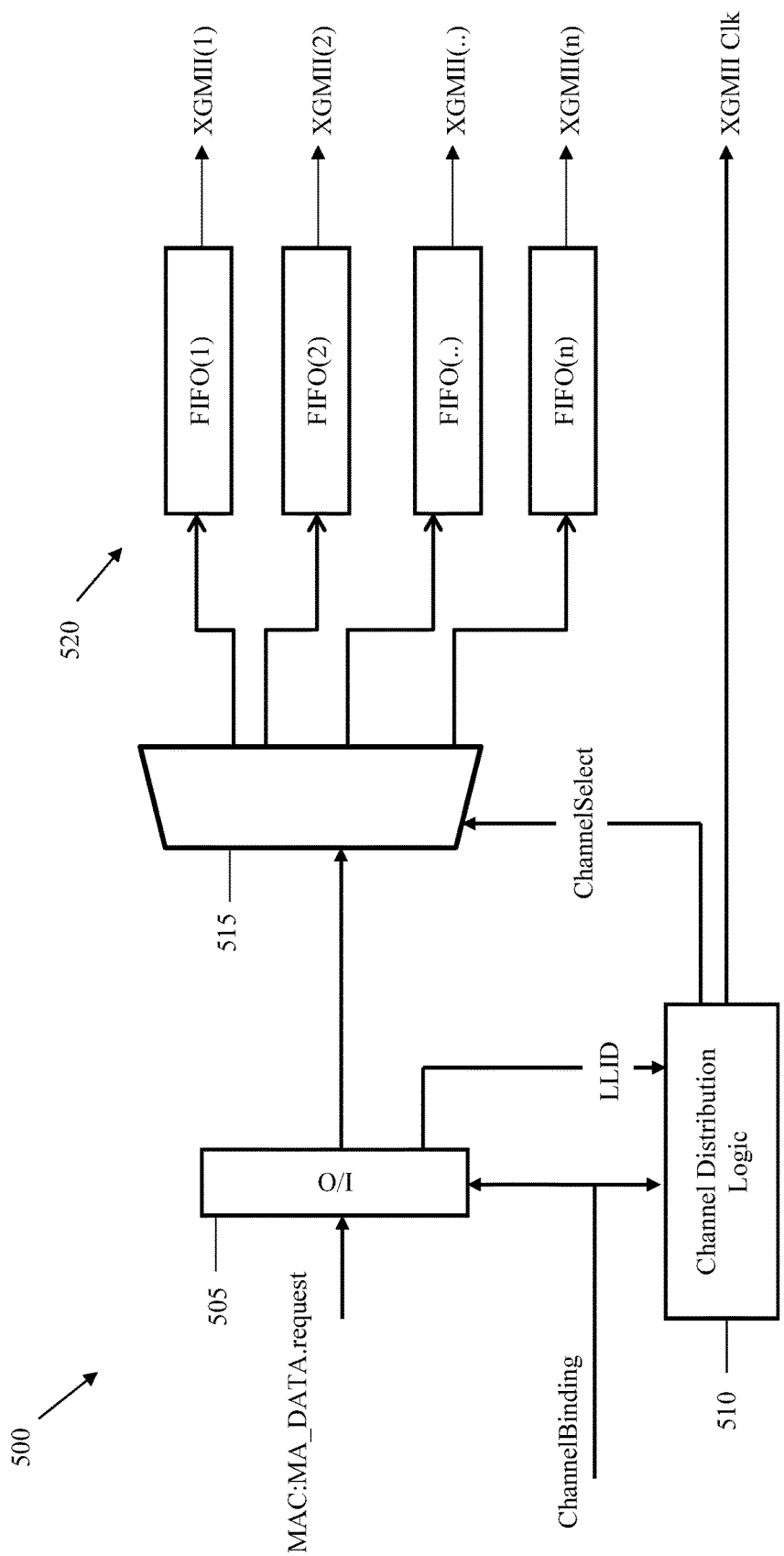
FIG. 5 is a schematic diagram of a transmitter according to an embodiment of the disclosure.

Referring now to FIG. 5, a block diagram is depicted of a transmitter 500 according to an embodiment of the disclosure. The transmitter 500 may be implemented in various entities disclosed herein such as the OLT 110 and/or ONUs 120. The transmitter 500 may comprise an input/output (I/O) block 505, which may be implemented by the RS 320 in FIG. 3. In addition, a MAC entity such as the MAC client 370 in FIG. 3 may initiate transmission by communicating a data request signal to the I/O block 505 via one of the MAC layers 310. In FIG. 5, an example of such a data request signal is denoted as MAC:MA_DATA.request, which may specify various information such as a destination address (DA), a source address (SA), size of a MAC service data unit (m_sdu), etc. According to one implementation, the I/O block 505 may comprise a preamble replacement and idle insertion block 505 configured to replace a preamble and SFD of a standard Ethernet frame (e.g., see Table 1) with an EPON-specific preamble as previously discussed with respect to FIG. 2. As a result, the third byte of the replaced preamble may include an SLD value, while the sixth and seventh bytes may include an LLID followed by a CRC8.

The preamble replacement and idle insertion block 505 may also be configured to insert a CBI field in either the fourth or the fifth byte of the replaced preamble to generate a modified preamble such as depicted in FIG. 2. The preamble replacement and idle insertion block 505 may then replicate the CBI field based on a number of channels (or lanes) through which the LLID is to be transmitted. For example, the data request signal from the MAC client and/or input received from another source may include provisioning information indicating a number of LLIDs and a number of channels to be used by each LLID, e.g., one LLID may be transmitted via one channel, while another LLID may be transmitted via two channels, four channels, etc. If one LLID is to be transmitted across two channels, the preamble replacement and idle insertion block 505 may replicate that LLID twice. Likewise, if one LLID is to be transmitted across four channels, the preamble replacement and idle insertion block 505 may replicate that LLID four times.

In some aspects, the preamble replacement and idle insertion block 505 may also replicate a Terminate control character /T/ in a similar manner as the LLID. Thus, if one LLID is to be transmitted via two channels, the replication performed by the preamble replacement and idle insertion block 505 may be such that the LLID and Terminate control character /T/ would be repeated in each of the two channels used to transmit data (e.g., an Ethernet frame). Likewise, if an LLID were to be transmitted across four channels, the LLID and Terminate control character /T/ would be repeated four times.

The preamble replacement and idle insertion block 505 may be coupled to a channel distribution logic block 510 configured to distribute data based on a ChannelBinding signal generated by the preamble replacement and idle insertion block 505. For example, the ChannelBinding signal may cause the channel distribution logic block 510 to distribute data (e.g., headers, trailers, data frames, etc.) through a multiplexer 515 to n first-in first-out (FIFO) FIFO(1) . . . FIFO(n) buffers 520, where n is a positive integer greater than one. In FIG. 5, the FIFO(1) . . . FIFO(n) buffers 520 correspond to a distinct channel such as one of the four lanes discussed with respect to FIG. 4. In this case, the distinct channel corresponding to each FIFO(1) . . . FIFO(n) buffer may be represented as channel(1) . . . channel(n).

Once the beginning of a bonded data frame is identified using a corresponding CBI field in the modified preamble generated by the preamble replacement and idle insertion block 505, the bonded data frame may be divided into a plurality of equally sized fragments. Based on the Channel-Binding signal received from the preamble replacement and idle insertion block 505, the channel distribution logic block 510 may output a ChannelSelect signal to the multiplexer 515 such that one of the data fragments is delivered to an appropriate channel via one of the FIFO(1) . . . FIFO(n) buffers 520. In some aspects, the ChannelSelect signals outputted to the multiplexer 515 may be such that the FIFO(1) . . . FIFO(n) buffers 520 deliver data to each channel(1) . . . channel(n) in a round robin fashion.

Additionally or alternatively, the FIFO(1) . . . FIFO(n) buffers 520 may be configured to align data frames for synchronous transfer over n interfaces XGMII(1) . . . XGMII(n), e.g., to physical layers 325-1 . . . 325-N (where n=N). Furthermore, data transmission rate may be controlled by a clock (Clk) signal, such as an XGMII Clk signal that may be used when implementing the PON 100 as an XG-PON. As previously mentioned, the PON 100 may be implemented as any suitable type of PON, and any suitable interface may be used. Thus, the present embodiments are not limited to clock signals and interfaces such as depicted in FIG. 5.

Figure 6:
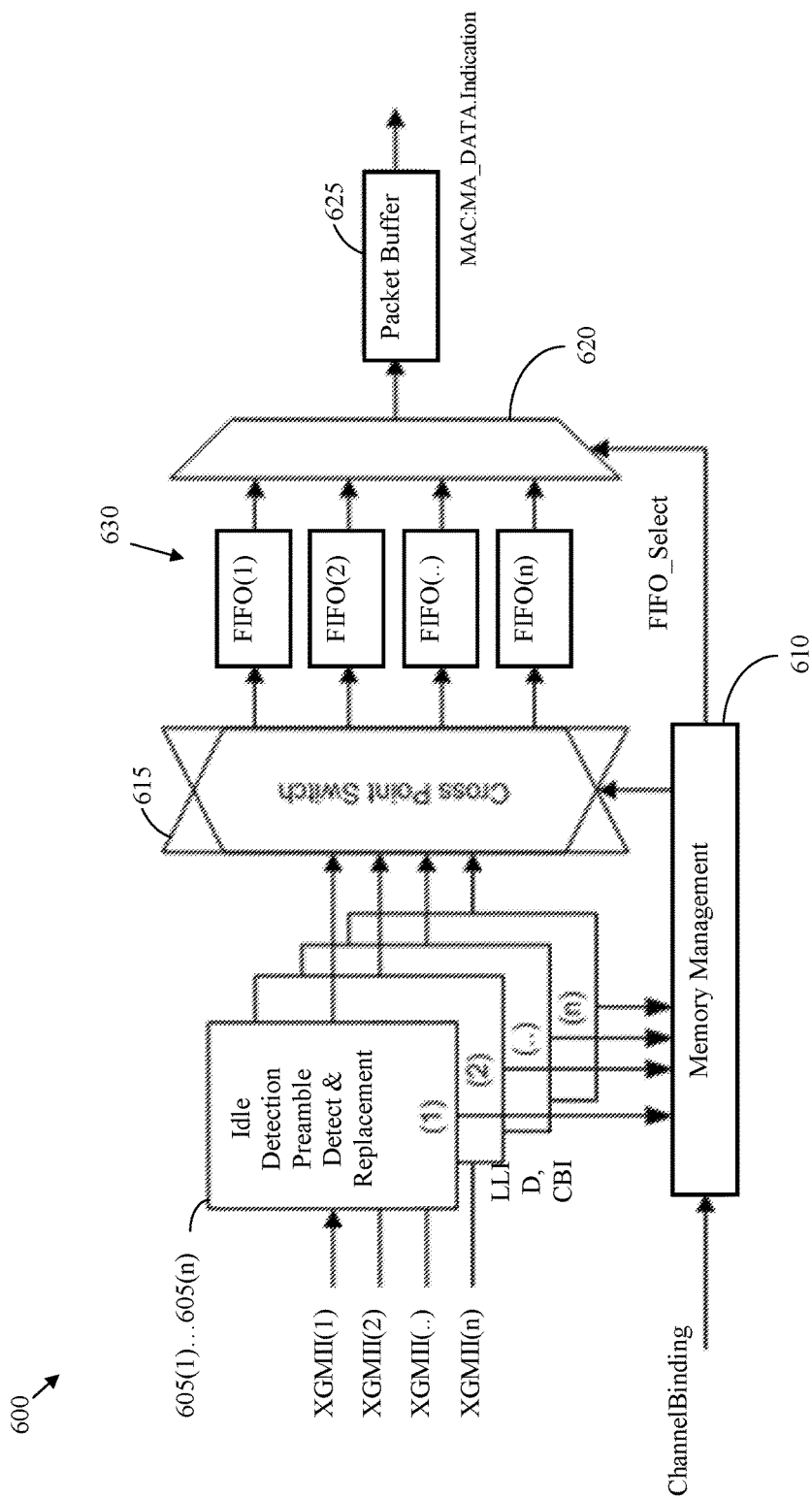
FIG. 6 is a schematic diagram of a receiver according to an embodiment of the disclosure.

Referring now to FIG. 6, a block diagram is depicted of a receiver 600 according to an embodiment of the disclosure. Like the transmitter 500, the receiver 600 may be implemented in various entities disclosed herein such as the OLT 110 and/or ONUs 120. For example, at least one transmitter 500 may be implemented in the OLT 110 for downlink transmissions to an ONU 120, in which case at least one receiver 600 may be implemented in the ONU 120 to receive data from the OLT 110. Similarly, at least one transmitter 500 may be implemented in the ONU 120 for uplink transmissions to the OLT 110, in which case at least one receiver 600 may be implemented in the OLT 110 to receive data from the ONU 120. In some aspects, the transmitter 500 and receiver 600 combined into a single transceiver unit implemented in the OLT 110 and/or ONUs 120.

The receiver 600 may comprise a plurality of I/O blocks 605(1) . . . 605(n) for receiving data from the transmitter 500 via XGMII(1) . . . XGMII(n). According to one implementation, the n interfaces in FIGS. 5 and 6 may comprise a mixture of different interfaces. That is, one or more of the interfaces (e.g., an XGMII(2)) may be replaced with a different type of interface (e.g., GMII). Upon receiving data frames via XGMII(1) . . . XGMII(n), the input blocks 605(1) . . . 605(n) may remove excess idle code words or idle symbols (e.g., /I/ and /i/) that were inserted (i.e., at the transmitter), as well as any duplicate headers and trailers (e.g., CBI and /T/) that were replicated by the I/O 505. In addition, the input blocks 605(1) . . . 605(n) may detect preambles modified by the I/O 505 and replace them with another preamble, e.g., in order to be recognized by the MAC Control 310 and/or MAC sublayers 315. More specifically, each input block 605(1) . . . 605(n) may convert a modified preamble into its original form, such as a MAC preamble having seven hexadecimal bytes followed by an SFD byte.

The receiver 600 may further comprise a memory management interface (MMI) 610 coupled to the input blocks 605(1) . . . 605(n), which may extract LLID and CBI values from each modified preamble and pass those values to the MMI 610. Among other things, the MMI 610 may control operation of a cross point switch 615 such as to ensure a non-blocking interface is provided from the I/O blocks 605 to FIFO (1) . . . FIFO(m) buffers 630, where m may be a positive integer equal to a number of active LLIDs. For instance, the cross point switch 615 may configured as an n×m switch (n-input, m-output), where any one of the n inputs may be directed to any one of the m outputs. If a cross point switch does not operate properly, a blocking scenario may occur if the cross point switch directs an input to one FIFO that blocks another input from getting to another FIFO. Accordingly, the MIM 610 may control operation of the cross point switch 615 to prevent such blocking scenarios.

Moreover, the MMI 610 may be configured to control data distribution to the FIFO (1) . . . FIFO(m) buffers 630 based on a ChannelBinding signal, such as discussed with respect to FIG. 5. For instance, the MMI 610 may use the LLID and CBI values to ensure incoming data fragments are properly distributed from the I/O blocks 605 to the FIFO (1) . . . FIFO(m) buffers 630, where m is a positive integer. For example, assuming each LLID may correspond to only one of the FIFO (1) . . . FIFO(m) buffers 630, the MMI 610 may direct data fragments associated with a particular frame to one of the FIFO (1) . . . FIFO(m) buffers 630. Based on the LLID and CBI values, the MMI 610 may determine when all data fragments necessary to complete a data frame have been queued in one of the FIFO (1) . . . FIFO(m) buffers 630. In turn, the MMI 610 may generate a selection signal that causes a multiplexer 620 to select one of the FIFO (1) . . . FIFO(m) buffers 630 containing data fragments of a complete frame. For example, if the first FIFO(1) buffer is selected, the FIFO(1) buffer may release the data fragments in an appropriate order to reconstruct the completed frame, which may be stored in a buffer 625. The receiver 600 may then generate a MAC signal to inform a MAC entity that a recovered data frame has been received. In FIG. 6, the MAC signal is denoted by MAC:MA_DATA.indication, which the receiver 600 may use to send data (e.g., from RS 320) to the MAC entity (e.g., MAC Control 310).

Figure 7:
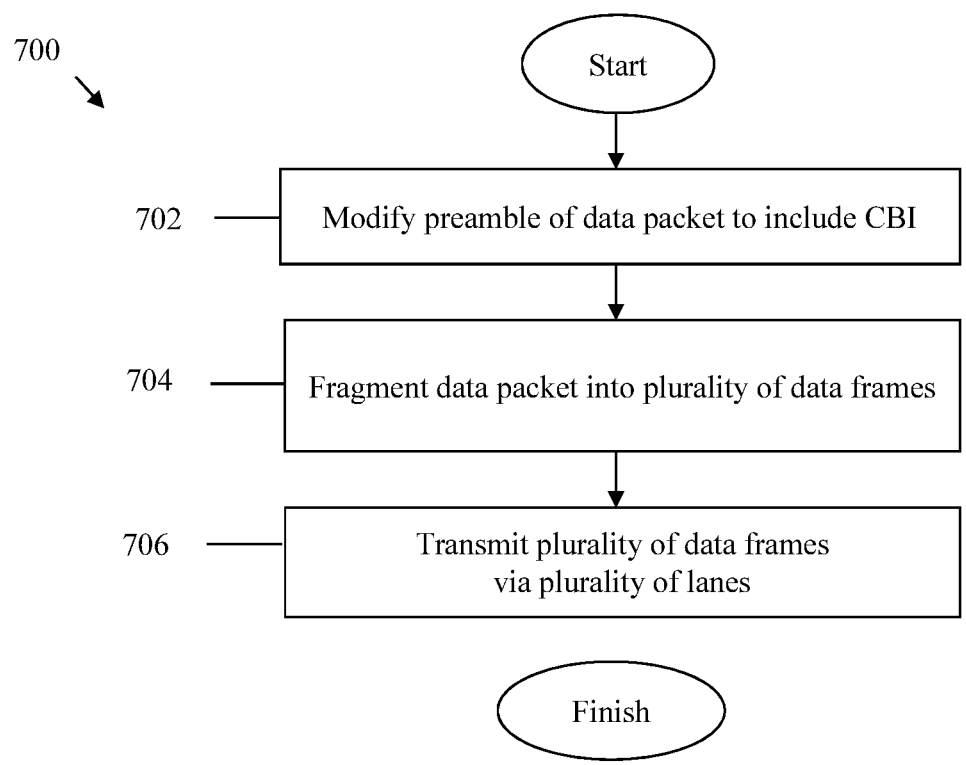
FIG. 7 depicts a flowchart of a method for transmitting data according to an embodiment of the disclosure.

FIG. 7 depicts a method 700 of transmitting data packets over a plurality of data lanes according to an embodiment of the disclosure. The operations may be performed in the order shown, or in a different order. Further, two or more of the operations may be performed concurrently instead of sequentially. In general, the method 700 may be implemented by both the OLT 110 and ONUs 120 to perform downlink and uplink transmissions, respectively (e.g., using transmitter 500). Moreover, the method 700 may initiate when a MAC entity (e.g., MAC Control 31) sends the RS 320 (e.g., via I/O unit 505) a request to transmit data (e.g., via MAC:MA_DATA.request signal in FIG. 5).

The method 700 commences at block 702, where a preamble of a data packet may be modified to include a channel bonding indicator (CBI). At block 704, the method 700 may fragment the data packet into a plurality of data frames. In some aspects, the data packet may be fragmented into equally sized data frames. In other aspects, the data packet may be fragmented into data frames having different sizes. At block 706, the method 700 may transmit the plurality of data frames over a plurality of lanes. As previously discussed, the CBI may comprise various information that may be used to improve transmissions over multiple lanes, e.g., via method 700. As one example, the CBI may indicate that a particular frame is part of a data packet that has been fragmented. In addition, the CBI may identify a lane order occupied by this particular frame. Furthermore, the CBI may indicate whether fragmented data frames in different lanes are associated with the same or different LLIDs.

Figure 8:
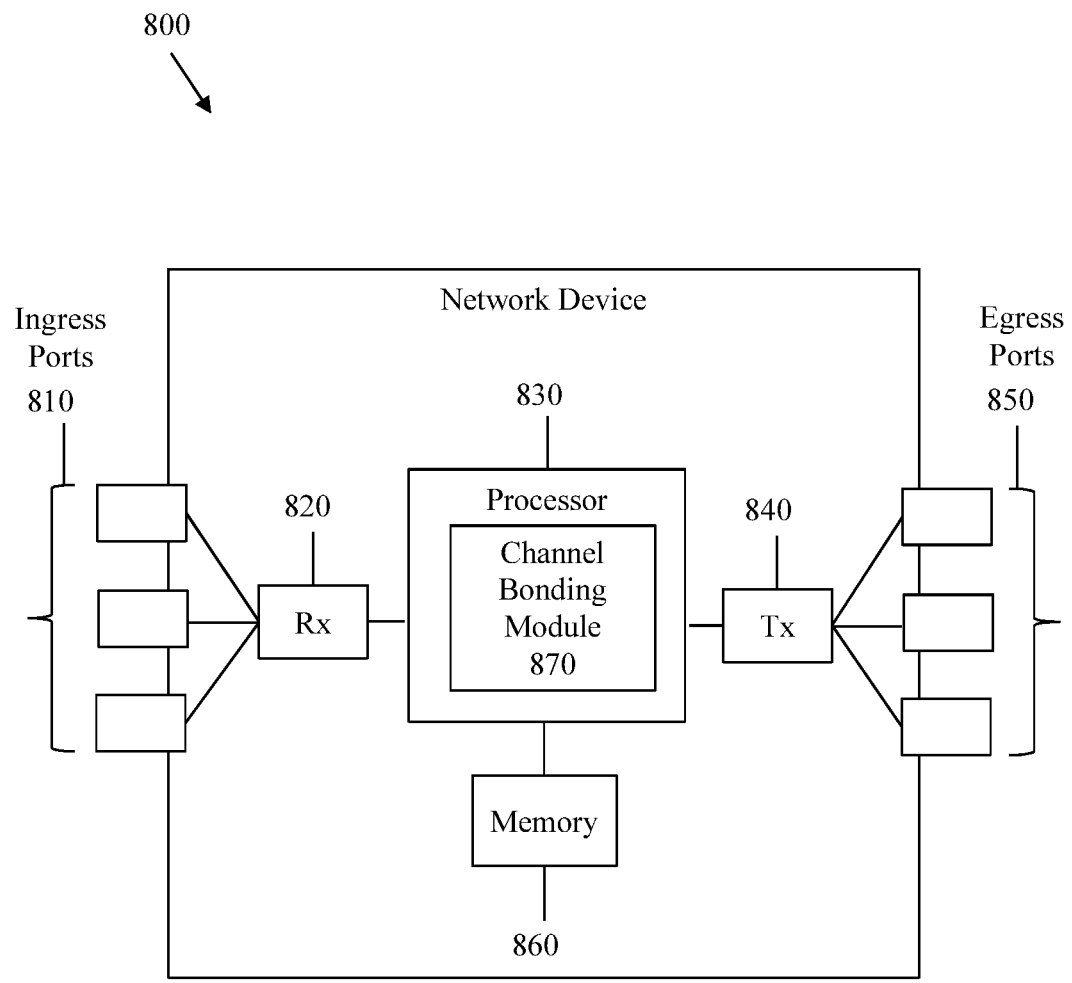
FIG. 8 depicts a schematic diagram of a network unit according to an embodiment of the disclosure.

FIG. 8 depicts a schematic diagram of a network device 800 according to an embodiment of the disclosure. The network device 800 is suitable for implementing the disclosed embodiments as described herein. For example, the network device 800 may be implemented as the OLT 110, as the ONU 120, and/or as any other component disclosed herein. The device 800 comprises ingress ports 810 and a receiver unit or units (Rx) 820 for receiving data; a processor, microprocessor, logic unit, or central processing unit (CPU) 830 configured to process the data; a transmitter unit or units (Tx) 840 and egress ports 850 for transmitting the data; and a memory 860 for storing the data. The network device 800 may also comprise optical-to-electrical (OE) components and electrical-to-optical (EO) components coupled to the ingress ports 810, the receiver units 820, the transmitter units 840, and/or the egress ports 850 for egress or ingress of optical or electrical signals.

The processor 830 may be implemented by hardware and/or software. The processor 830 may be implemented as one or more CPU chips, cores (e.g., as a multi-core processor), field-programmable gate arrays (FPGAs), application specific integrated circuits (ASICs), or digital signal processors (DSPs). The processor 830 may be communicatively linked to the ingress ports 810, receiver units 820, transmitter units 840, egress ports 850, and/or memory 860.

The processor 830 comprises a channel bonding module 870 configured to implement the embodiments disclosed herein, including method 700. The inclusion of the channel bonding module 870 may therefore provide a substantial improvement to the functionality of the network device 800 and effects a transformation of the network device 800 to a different state. Alternatively, the channel bonding module 870 may be implemented as readable instructions stored in the memory 860 and executable by the processor 830. The network device 800 may include any other means for implementing the embodiments disclosed herein, including method 700.

The memory 860 comprises one or more disks, tape drives, or solid-state drives and may be used as an over-flow data storage device, to store programs when such programs are selected for execution, or to store instructions and data that are read during program execution. The memory 860 may be volatile or non-volatile and may be read-only memory (ROM), random-access memory (RAM), ternary content-addressable memory (TCAM), or static random-access memory (SRAM).

In an embodiment, the disclosure includes means for implementing a method at a transmitter in a passive optical network (PON). The transmitter includes means for modifying a preamble of a data packet to include an indicator associated with at least one lane to be used to transmit the data packet. The transmitter further includes means for fragmenting the data packet into frames, and means for transmitting the frames over a plurality of lanes, where the indicator is configured to identify a first lane selected from the plurality of lanes and to identify at least one frame transmitted over the first lane.

In an embodiment, the disclosure includes means for implementing an apparatus in a passive optical network (PON). The apparatus includes means for modifying a preamble of a data packet to include an indicator associated with at least one lane to be used to transmit the data packet. The apparatus further includes means for transmitting the data packet in multiple fragments over a plurality of lanes, where the indicator is configured to identify a first lane selected from the plurality of lanes and to identify at least one fragment transmitted over the first lane. In some aspects, the apparatus includes a reconciliation sublayer (RS) having means for modifying the preamble of the data packet to include the indicator. In additional or alternative aspects, the apparatus includes a transmitter having means for transmitting the data packet in multiple fragments.

In an embodiment, the disclosure includes one or more means for executing computer instructions on a non-transitory computer-readable medium to implement a method in a passive optical network (PON). The one or more means including means for modifying a preamble of a data packet to include an indicator associated with at least one lane to be used to transmit the data packet. The one more means further including means for fragmenting the data packet into frames, and means for transmitting the frames over a plurality of lanes, where the indicator is configured to identify a first lane selected from the plurality of lanes and to identify at least one frame transmitted over the first lane.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented at a transmitter in a passive optical network (PON), the method comprising:
   the transmitter fragmenting a data packet into multiple frames, with each frame of the multiple frames including a data packet preamble, with the data packet preamble including an indicator associated with at least one lane to be used to transmit the data packet and a logical link identifier (LLID), the indicator identifying a first lane selected from a plurality of lanes, identifying at least one frame transmitted over the first lane, and identifying a lane order of the plurality of lanes; and
   the transmitter transmitting the multiple frames over the plurality of lanes.

2. The method of claim 1, wherein the indicator comprises a synchronization indicator for assisting a receiver device in aligning fragmented packets in a proper order.

3. The method of claim 1, further comprising, responsive to fragmenting the data packet into the multiple frames, the transmitter replicating the indicator into each lane of the plurality of lanes.

4. The method of claim 1, wherein the transmitter comprises a reconciliation sublayer (RS), with the RS modifying the data packet preamble to include the indicator.

5. The method of claim 1, with the indicator further identifying a lane order of the plurality of lanes.

6. The method of claim 3, wherein each indicator is configured to identify a respective set of frames transmitted over a lane in which that indicator has been replicated.

7. The method of claim 3, wherein the replicated indicators are configured to identify at least one of:
each lane used to transmit the multiple frames;
frames transmitted over each lane; or
each frame associated with the data packet.

8. The method of claim 4, wherein the RS is coupled to the plurality of lanes via a plurality of media-independent interfaces.

9. The method of claim 6, wherein each indicator is further configured to indicate that frames within the respective set of frames form part of the data packet.

10. An apparatus in a passive optical network (PON), the apparatus comprising:
a reconciliation sublayer (RS) configured to include an indicator in a preamble of a data packet, the indicator associated with at least one lane to be used to transmit the data packet, the preamble comprising the indicator and a logical link identifier (LLID), the indicator identifying a first lane selected from a plurality of lanes, identifying at least one frame transmitted over the first lane, and identifying a lane order of the plurality of lanes; and
a transmitter coupled to the RS and configured to transmit the data packet in multiple frames over a plurality of lanes.

11. The apparatus of claim 10, wherein the indicator comprises a synchronization indicator for assisting a receiver device in aligning fragmented packets in a proper order.

12. The apparatus of claim 10, the RS further configured to, responsive to fragmenting the data packet into the multiple fragments, replicate the indicator into each lane of the plurality of lanes.

13. The apparatus of claim 10, with the RS modifying the preamble to include the indicator.

14. The apparatus of claim 10, wherein the RS is coupled to the plurality of lanes via a plurality of media-independent interfaces.

15. The apparatus of claim 10, with the indicator further identifying a lane order of the plurality of lanes.

16. The apparatus of claim 12, wherein each indicator is configured to identify a respective set of frames transmitted over a lane in which that indicator has been replicated.

17. The apparatus of claim 12, wherein the replicated indicators are configured to identify at least one of:
each lane used to transmit the multiple frames;
frames transmitted over each lane; or
each frame associated with the data packet.

18. The apparatus of claim 16, wherein each indicator is further configured to indicate that frames within the respective set of frames form part of the data packet.

19. A non-transitory computer-readable medium storing computer instructions for implementing a method in a passive optical network (PON), that when executed by one or more processors, cause the one or more processors to perform the steps of:
fragmenting a data packet into multiple frames, with each frame of the multiple frames including a data packet preamble, with the data packet preamble including an indicator associated with at least one lane to be used to transmit the data packet and a logical link identifier (LLID), the indicator identifying a first lane selected from a plurality of lanes, identifying at least one frame transmitted over the first lane, and identifying a lane order of the plurality of lanes; and
transmitting the multiple frames over the plurality of lanes.

\* \* \* \* \*

UNITED STATES PATENT AND TRADEMARK OFFICE
CERTIFICATE OF CORRECTION

PATENT NO. : 10,484,098 B2
APPLICATION NO. : 16/259555
DATED : November 19, 2019
INVENTOR(S) : Duane Remein et al.

Page 1 of 1

It is certified that error appears in the above-identified patent and that said Letters Patent is hereby corrected as shown below:

On the Title Page

Page 2, First Column, (60) should read:
Provisional application No. 62/215,862, filed on Sep. 9, 2015.

Signed and Sealed this
Thirty-first Day of December, 2019

Andrei Iancu
*Director of the United States Patent and Trademark Office*